April 18, 1961 L. B. COOPER 2,980,133
MULTI-PURPOSE DIAPHRAGM GAS VALVE
Filed April 12, 1956 3 Sheets-Sheet 1
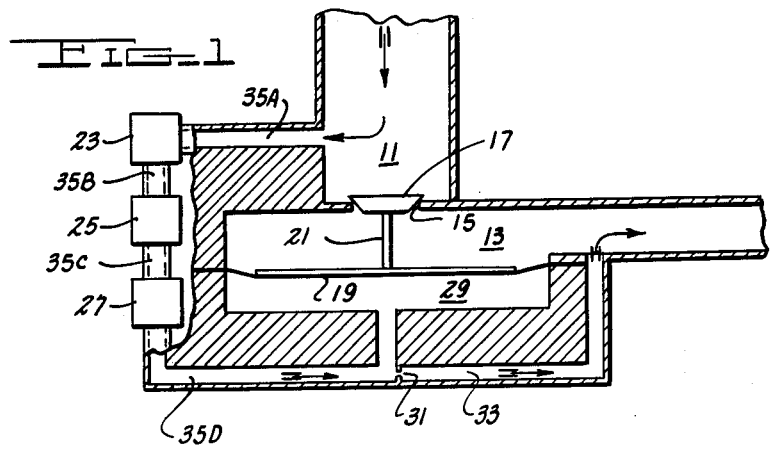
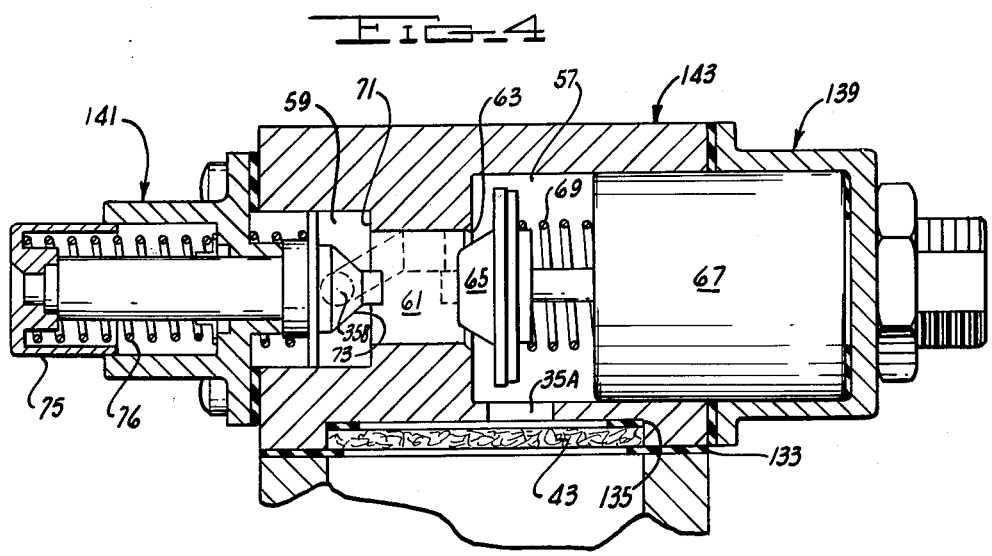
INVENTOR.
LEMUEL BROWNING COOPER
BY
SMITH, OLSEN & KOTTS
ATTORNEYS April 18, 1961 L. B. COOPER 2,980,133
MULTI-PURPOSE DIAPHRAGM GAS VALVE
Filed April 12, 1956 3 Sheets-Sheet 2
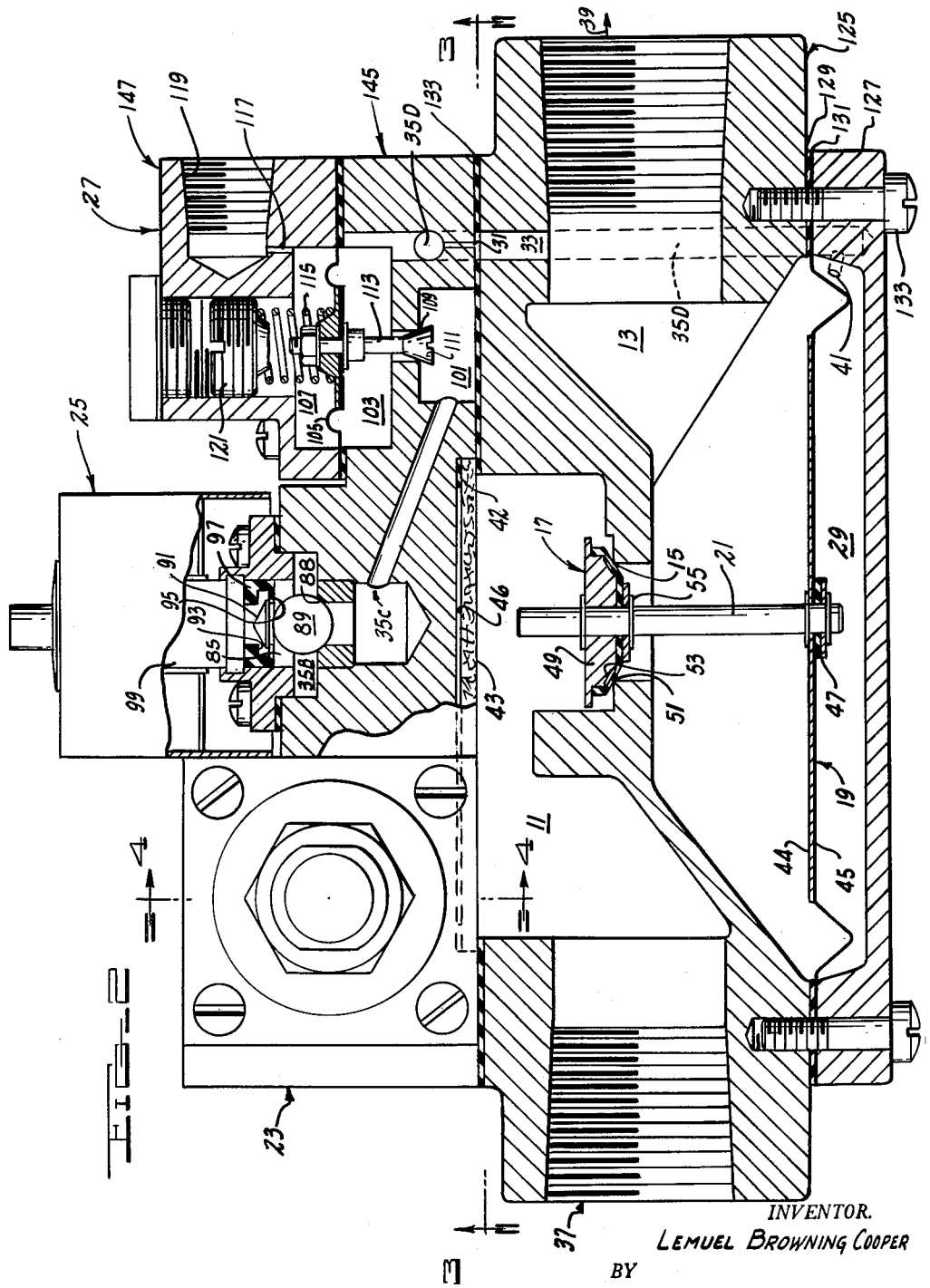
INVENTOR.
LEMUEL BROWNING COOPER
BY
SMITH, OLSEN & KOTTS
ATTORNEYS

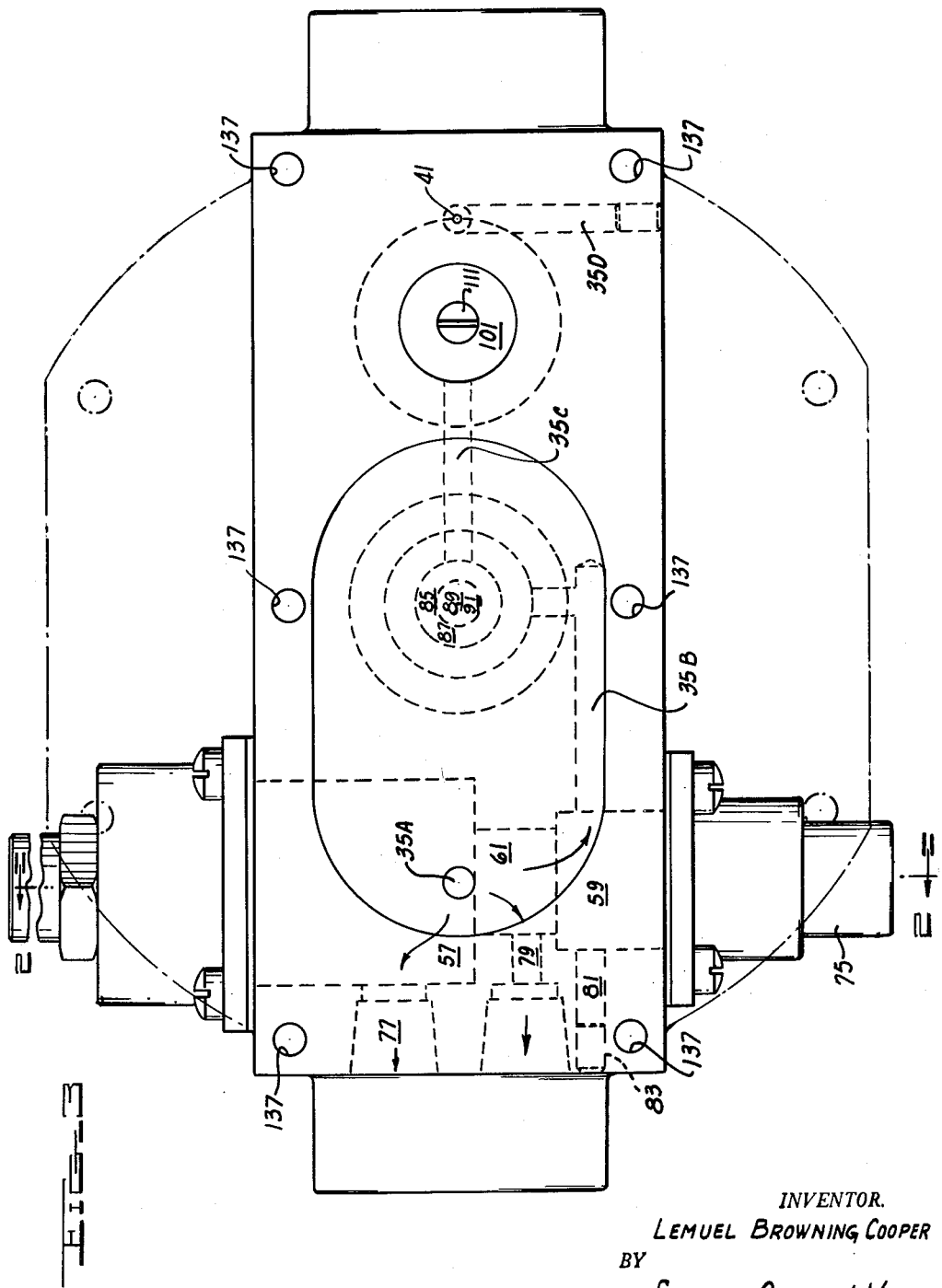

United States Patent Office 2,980,133
Patented Apr. 18, 1961

2,980,133
MULTI-PURPOSE DIAPHRAGM GAS VALVE

Lemuel Browning Cooper, San Carlos, Calif., assignor, by mesne assignments, to American Radiator & Standard Sanitary Corporation, New York, N.Y., a corporation of Delaware Filed Apr. 12, 1956, Ser. No. 577,767

5 Claims. (Cl. 137—495)

This invention concerns a diaphragm valve for the control of fluid flow. More particularly it concerns a valve for the control of the flow of a combustible gas to a combustion zone.

A fluid valve which has come into general use consists generally of a valve seat across the line of flow, a valve cooperating with the seat, and a diaphragm attached for simultaneous movement with the valve and positioned in a manner such as to open and close the valve in response to fluid pressure. Many auxiliary structures have been suggested to control the fluid flow in response to a number of predetermined conditions and many other structures have been suggested as means for making the valve-diaphragm assembly more sensitive to demands upon it.

For example, some units provide for the valve to open in response to inlet fluid pressure on the diaphragm while depending on either a spring or heavy weight to return the valve to its closed position. The use of an auxiliary structure such as a spring introduces a new force not inherent in the structure itself. Similarly, attempts have been made to overcome the problems of fluid control by the provision of a complicated series of pressure chambers each with its own valve arrangement.

Springs are found necessary in what might be termed "upside down" valves; that is, a valve which closes upwardly; for the reason that an added force is necessary to overcome the weight of the valve assembly as well as to overcome the inlet gas pressure in closing the valve. Similarly, "right side up" valves have been provided with springs even though they close downwardly; this for the reason that there has not been an effective use of the pressures inherent in the fluid system.

In connection with my analysis of the various control problems considered herein I have concluded that there are two basic inherent forces in fluid diaphragm valves:
(1) The weight of the necessary moving parts, that is the weight of the valve and diaphragm assembly.
(2) The difference in pressure between inlet and exit fluids.

In addition to the problem of fluid flow control a second basic problem arising in the use of diaphragm fluid valves stems from the usual necessity of joining a multiplicity of control units to each other and to the main valve casing. Installation in a gas furnace, for example, becomes inconvenient since there is the problem of hanging or fixing the control units to some structural member of the furnace. With continued usage there arises the problem of leakage at one of the many pipe joints as well as the likelihood of the substitution of some control unit into a system for which it was not designed.

These problems set a high premium on the provision of a unitary structure which will avoid the preceding difficulties.

It is an object of this invention to control fluid flow through a structure in a manner such that a satisfactory sensitivity of control can be maintained using a minimum of auxiliary structures.

It is a further object to provide a compact fluid control unit requiring a relatively small proportion of inlet gas to flow through the control conduit and requiring a minimum of connections to facilities exterior to it, to provide ease of installation, and to present a minimum number of joints for potential leakage.

It is a further object to provide a diaphragm fluid valve unit in which the forces used to influence the position of the diaphragm and valve are substantially inherent in the structure itself and require a minimum of auxiliary structures.

It is a further object of this invention to provide a diaphragm fluid valve in which one side of the diaphragm is subjected directly to exit fluid pressure and the other side of the diaphragm is subjected directly to inlet gas at a predetermined controlled pressure.

It is a further object to provide a diaphragm-valve assembly wherein a rupture of the diaphragm will effect a closing of the valve against the flow of fluid.

It is a still further object to provide a diaphragm fluid valve in which the forces tending to close the valve are limited to gravitational forces and substantially to the weight of the valve and diaphragm.

The foregoing and related objects are secured in my invention of a unitary structure for controlling the flow of fluid from an inlet to an outlet therein which provides a fluid conduit from said inlet to said outlet, said fluid conduit having a fluid inlet chamber and a fluid exit chamber; a valve seat positioned across the line of fluid flow in said fluid conduit; a main valve cooperating with said valve seat, movable downwardly to engage said valve seat to close said fluid conduit against fluid flow, and movable upwardly to open said fluid conduit; a pressure closure chamber; a diaphragm positioned below said main valve, said diaphragm being a lower movable wall of said fluid exit chamber, being an upper movable wall of said pressure closure chamber, and being joined to said main valve for simultaneous movement therewith; a control conduit from said fluid inlet chamber to said pressure closure chamber whereby inlet fluid pressure can be established in said pressure closure chamber; a control valve positioned in said control conduit and adapted to close said control conduit against fluid flow upon the attainment of a predetermined condition; a bleed conduit from said pressure closure chamber.

My invention provides an even greater contribution to ease of manufacture, ease of installation, and ease of maintenance where a plurality of control valves are positioned in series in the control conduit of the unitary structure.

Further, I believe it important in securing these objects in accordance with my invention that auxiliary structures be kept to a minimum, that only a portion of the main gas flow passes through the control conduit, and that the forces tending to close the main valve be limited to gravitational forces and limited substantially to the weight of the main valve and diaphragm.

Further, I think it important in the securing of the objects in accordance with my invention that there be a minimum of pressure chambers; particularly, that there be no pressure chamber between the diaphragm and the exit gas chamber.

A further feature of my structure is the inclusion of the bleed conduit from the pressure closure chamber within the unitary structure. This retains the above-mentioned advantages of a unit structure and, in combination with the particular valve and diaphragm assembly described herein, gives better pressure control since the pressure closure chamber bleeds into the relatively constant pressure of the exit chamber rather than into some artificially low or high pressure chamber disassociated from the unit itself.

In the accompanying drawings:

Fig. 1 is a diagrammatic representation of a preferred embodiment of the invention.

Fig. 2 is a view partly in section illustrating a preferred commercial unit.

Fig. 3 is a view along the line 3—3 of Fig. 2.

Fig. 4 is a view along 4—4 of Fig. 2.

Referring specifically to the drawings, Fig. 1 shows diagrammatically a fluid control structure having a fluid inlet chamber 11 and a fluid exit chamber 13. A valve seat 15 cooperating with a main valve 17 serves to control the flow of fluid from the inlet chamber 11 to the exit chamber 13.

A diaphragm 19 is connected to the main valve 17 by means of a stem 21.

A fluid control conduit 35 leads from the inlet chamber 11 through a plurality of control devices 23, 25, 27 to a pressure closure chamber 29, the latter being positioned immediately below the diaphragm 19. Portions of the fluid control conduit 35 consist of a first portion 35A leading from the inlet chamber 11 to the first control device 23; a second portion 35B leading from the first control device 23 to the second control device 25; a third portion 35C leading from the second control device 25 to the third control device 27; and a fourth portion 35D leading from the third control device 27 to the pressure closure chamber 29. An orifice 31 leading into a bleed conduit 33 provides for bleeding fluid from the pressure closure chamber 29 to the exit fluid chamber 13.

In operation fluid enters the inlet chamber 11 and exerts a pressure (predetermined and controlled) on the under side of the diaphragm 19 via the fluid control conduit 35 and the pressure closure chamber 29. Although the unit pressure in the pressure closure chamber 29 is considerably less than the unit pressure in the inlet chamber 11 the area of the diaphragm 19 is sufficiently greater than the area of the valve 17 so that the total upward pressure on the diaphragm 19 can exceed the total downward pressure on the valve 17. Thus increase in pressure in the pressure closure chamber 29 to the predetermined value causes the diaphragm 19 to rise and simultaneously therewith causes the main valve 17 to rise. When the main valve 17 opens fluid passes through the main valve opening into the exit chamber 13. While fluid is being removed from the exit chamber 13; for example, to a combustion zone; the pressure against the underside of the diaphragm 19 will be somewhat higher than the total downward pressure and the main valve 17 will remain open. In this manner the diaphragm 19 will seek a position of equilibrium to balance the pressures exerted upon it and will effect a rate of gas flow through the main valve consistent with those pressures.

At any time that one or more of the control devices 23, 25, and 27 in the control conduit 35 effects a closing of the control conduit fluid will no longer be supplied to the pressure closure chamber 29 and the pressure in the latter chamber will steadily diminish as the fluid bleeds through the orifice 31 into the exit chamber 13. Thus, the closing of the control conduit 35 by any one of the control devices 23, 25, 27 effects a lowering of the pressure in the pressure closure chamber 29 and therefore effects a closing of the main valve 17.

As indicated previously, it is an important feature of this invention that a satisfactory sensitivity of response is secured in a compact unit and with a minimum of auxiliary structures. To secure this objective the structure uses, in so far as possible forces that are inherent in the structure itself. Two such forces are so inherent. The first of the forces is the weight of the diaphragm-valve assembly. Since such weight is ever present, I prefer to use it as a force for the downward movement of the diaphragm-valve assembly. In providing for this downward movement the use of springs and auxiliary weights is specifically avoided.

A second inherent force in a fluid control valve of the type under consideration is the difference in pressure between the inlet and exit fluid. The force made available by this difference is used as the sole control force to counter the weight of the diaphragm-valve assembly. In order to achieve a satisfactory sensitivity in response to this second force, I provide for the direct contacting of the two sides of the diaphragm by predetermined and controlled inlet and exit gas pressures respectively while avoiding the positioning of pressure balancing fluid chambers intermediate the diaphragm and either one of these direct pressures. By "pressure balancing fluid chambers" I do not refer to necessary control devices which respond to conditions outside the structure but rather I refer to such chambers inserted in a structure to balance out forces created within the structure because of the nature of its design.

Fig. 1 also illustrates diagrammatically a second important feature of my invention; that is, that the structure is a compact unitary one having one port and one valve handling the main gas flow. This unitary structure makes for easy installation and provides for a minimum of operating difficulties. Specifically, I do not provide for exterior conduits in the control circuit since such conduits in conventional designs provide for potential leakage points at the points where they join each other or where they are joined to the body of the main structure. A further advantage of including all control devices within a unitary structure is that interchange or substitution of other control devices is avoided. The sole use of the control device designed for use with the unit leads to maximum efficiency and to trouble free operation. Similarly, where the control mechanisms are built into the unitary structure there is less likelihood of the mechanical damage which frequently is inflicted on isolated control units.

Referring specifically to Figs. 2, 3, and 4; these represent various views of a commercial embodiment of my invention. In all the figures the same numbers are used to describe like structures.

A commercial embodiment is provided with an inlet port 37 leading to a fluid inlet chamber 11 and an exit port 39 leading from a fluid exit chamber 13. A valve seat 15 cooperating with a main valve 17 serves to control the flow of fluid from the inlet chamber 11 to the exit chamber 13. A diaphragm 19 is positioned below the main valve 17 and is joined to it by the stem 21 for simultaneous movement therewith. To control circuit 35 (various portions being 35A, 35B, 35C, 35D) passes in series through a number of control mechanisms 23, 25, 27 to the pressure closure chamber 29 positioned below the diaphragm 19. A conduit 41 leading via a conduit 35D, an orifice 31, and a conduit 33 to the exit chamber 13 provides for the bleed of fluid from the pressure closure chamber 29.

A filter 43, provided with a spacer member 42, is positioned across the inlet chamber 11 to provide an upper wall for said inlet chamber. The filter 43 is, in this manner, positioned across the entrance to the control conduit 35A, the spacer member creating a pathway 46 for gas above the filter 41. The control circuit 35 leads first 35A into a reset safety valve 23, thence 35B to a solenoid valve 25 responsive to a thermostat (not shown), thence 35C to a pressure regulatory valve 27, and thence 35D to the pressure closure chamber 29.

The diaphragm 19 is constructed of a thin rigid sheet or pressure plate 44 which may be metal, plastic and the like but preferably is quite light in weight. The pressure plate 44 is adjacent to a relatively more flexible membrane 45 preferably rubber or the like material, the pressure plate preventing buckling or distortion of the flexible membrane. The diaphragm 19 is attached to the stem 21 with a number of metal or plastic washers or snap rings 47. The stem 21 at its other end is attached to the main valve 17. The latter consists of a plug 49 of a suitable material, preferably hardened rubber and the like and a relatively softer rubber-like material 51 to cushion the plug against the seat 15. The contour of the plug 49 is slightly concave 53 opposite the point of the seat 15. This concave surface 53 provides for the inward flexing of the relatively more pliable plug membrane 51 and thus provides a tighter seal. A number of washers or snap rings 55 may be used in the fixing of the main valve 17 to the stem 21.

Referring now specifically to the control devices, three of which are illustrated in the commercial embodiment being described; fluid passing from the inlet chamber 11 through the filter 43 to the control conduit 35A enters the first control device; a reset safety valve 23.

The reset safety valve mechanism 23, shown particularly in Figs. 3 and 4, consists generally of a reset inlet chamber 57, a reset exit chamber 59, and a reset intermediate chamber 61. A valve seat 63 is positioned in the reset inlet chamber 57 and cooperates with a valve 65 which is actuated by an electromagnet 67, the valve 65 being biased toward the closed position by a spring 69. The electromagnet 67 is energized by a thermo-couple (not shown) positioned in the combustion zone. The reset exit chamber 59 is provided with a port 35B for the passage of fluid to the second control device 25. The reset exit chamber 59 is also provided with a valve seat 71 cooperating with a valve 73 which is actuated by a manual reset button 75 and biased toward the open position by a spring 76. The inlet chamber of the reset safety valve 23 is provided with a port 77 for the passage of fluid to the safety pilot (not shown) when the valve of my invention is connected for operation with natural gas. The intermediate chamber 61 is provided with a port 79 which provides for the flow of fluid to the safety pilot (not shown) when the valve of my invention is connected for use with relatively heavier fluids such as bottled gases.

A cylindrical cavity 81 which is coaxial with a portion 35B of the control conduit leading from the exit chamber 59 of the reset safety valve 23 is provided with a closure plug 83. The cylindrical cavity has no function but is formed during manufacture of the unit when the conduit 35B is drilled out.

A second control device 25 illustrated herein is a temperature responsive solenoid valve and is connected with a thermostat (not shown). The temperature responsive control device 25 is provided with an inlet fluid chamber 85, an exit fluid chamber 87, and a conduit 35C for the passage of fluid to the third control device 27. The temperature responsive control device 25 is also provided with a valve seat 88 and a ball valve 89 cooperable therewith. The ball valve 89 cooperates with a conical member 91 which sets alternately against an upper surface 93 and against a lower surface 95 provided in resilient washer 97, the latter preventing "chatter" or "freezing" of the metal ball 89 against the metal surfaces of the solenoid. A solenoid 99 activated by the thermostat (not shown) serves to actuate the ball valve 89.

Referring now to a third control device 27 which, as illustrated herein, is a pressure regulating valve, the pressure regulating valve comprises an inlet fluid chamber 101, a lower pressure chamber 103 positioned under a flexible diaphragm 105, an upper atmospheric chamber 107 positioned above the flexible diaphragm 105, and a conduit 35D for the passage of fluid to the pressure closure chamber 29 positioned beneath the main diaphragm 19.

The pressure regulating valve also comprises a valve seat 109 and a valve 111, the latter being attached to the diaphragm 105 by means of a stem 113. A spring 115 biases the upward pressure of the diaphragm 105. A bleed orifice 117 is provided from the upper atmospheric chamber 107 to a suitable connection 119 for a vent line. An adjusting screw 121 provides for varying the tension on the spring 115 and the adjusting of the diaphragm 105 and valve 111 to a desired pressure; the valve 111 as illustrated being in its closed position.

At the end of the control conduit 35D nearest the lower pressure chamber 103, an orifice 31 leads to the main exit fluid chamber 13 for the purpose of bleeding fluid from the control conduit 35 and from the pressure closure chamber 29. The portion 35D of the control conduit also leads into a conduit 41 for passage of fluid to the pressure closure chamber 29.

Although three specific control devices have been chosen for purposes of illustration it will be appreciated that various other control devices can be added to or used in place of those described. Also it will be appreciated that such control units can be placed in a wide variety of sequences.

Operation of the diaphragm fluid valve illustrated in the drawings is as follows; the fluid being presumed, for purposes of illustration, to be a combustible gas being supplied to a furnace (not shown).

The gas is supplied from a gas main (not shown) to the inlet 37 where it flows into the gas inlet chamber 11. If the main valve 17 is open the gas flows into the exit chamber 13 and then into the exit pipe 39 and from there it goes to the combustion zone of the furnace.

A portion of the gas being provided to the gas inlet chamber 11 passes through the filter 43 and enters the reset safety control device 23 via the conduit 35A. If the gas being supplied is natural gas, the safety pilot line (not shown) is connected to the outlet port 77 and hence gas can flow directly from the conduit 35A to outlet port 77 of the reset safety valve via the reset inlet chamber 57 without being subjected to the various control mechanisms shown. However, should the burner and pilot flames be extinguished the thermostat adjacent the pilot flame cools off and ceases to energize the electromagnet 67 actuating the valve 65, thus causing the valve 65 to close against the seat 63. The closure of the valve 65 does not interrupt the flow of gas to the pilot via the port 77 but it does interrupt gas flow to the control circuit via the conduit 35B.

The shutting off of gas to the control circuit causes a reduction of pressure in the pressure closure chamber 29 beneath the main diaphragm 19 because of the bleeding of gas from the control circuit 35 via the orifice 31 and the conduit 33 and because of the bleeding of gas from the pressure closure chamber 29 via the conduit 41, the conduit 35D, the orifice 31 and the conduit 33. The lowering of pressure in the pressure closure chamber 29 effects a lowering of the diaphragm and hence causes the main valve 17 to move downwardly into its closed position. Therefore, with natural gas the ultimate effect of extinguishing the burner and pilot flames is to maintain the flow of gas to the pilot but to shut off the main gas flow to the combustion zone.

To restore service with natural gas it is necessary only to ignite the pilot flame and to manually press inwardly on the reset button 75. The pilot flame reheats the thermocouple which, in turn, energizes the electromagnet 67. Pressing inwardly on the reset button 75 pushes the valve 65 to its open position where it is held by the energized electromagnet 67. This sequence of events provides for passage of the gas into the control circuit 35 and thence to the pressure closure chamber 29 subjecting the under side of the diaphragm 19 to the inlet pressure of the gas. The latter pressure raises the diaphragm 19 and the main valve 17 and restores the flow of gas to the combustion zone through the main line.

Now assuming that the reset safety valve is connected for use with a so-called bottled gas or other relatively heavy gas, the gas line to the safety pilot is connected with the port 79 from the reset intermediate chamber 61 of the reset safety valve mechanism 23. If the pilot and combustion flames are extinguished, the thermo-couple cools thereby de-energizing the electromagnet 67 and actuating the valve 65 to its closed position. In this manner the supply of gas to the pilot via port 79 as well as the supply of gas to the control circuit 35B is shut off.

With the use of bottled gas, restoration of service involves a somewhat more serious problem than is the case with natural gas since heavier gases tend to accumulate in the combustion zone and build up to an explosive mixture with air. It is this potential danger which led to the development of reset safety valves. Thus, to light the pilot flame without supplying gas to the combustion zone it is necessary for the operator to press the reset button 75 to effect a moving of the valve 73 in the reset exit chamber 59 inwardly to close the valve 73 against the seat 71 to prevent the flow of gas into the control circuit 35B. The movement of the reset valve 73 inwardly, however, causes an engagement with the valve 65 in the reset inlet chamber 57 and moves it to the right (as shown in Fig. 4). This latter movement opens up the valve 65 for gas flow to the pilot via the port 79. When the pilot is ignited, it heats the thermo-couple thereby energizing the electromagnet 67 which, in turn, holds the valve 65 open without further manual assistance. At this time the reset button may be released to permit gas to flow into the control conduit 35B to reestablish pressure in the pressure closure chamber 29 and to open the main valve 17.

If the conditions in the reset safety valve 23 are normal and the pilot flame is burning gas will pass through the reset safety valve through the control conduit 35B into the solenoid valve 25 which is actuated by a thermostat subjected to room temperature. If room temperature is lower than that desired the thermostat actuates the solenoid 99 causing an upward movement of the ball valve 89 to open the control conduit. In this manner the inlet gas pressure is applied to the diaphragm 19 as previously described and the main valve 17 remains open for the supply of gas to the combustion zone.

When, however, a suitable ambient temperature has been reached the thermostat ceases to actuate the solenoid 99 and the ball valve 89 drops and closes the control circuit. Again, bleeding of gas pressure from the control circuit and the pressure closure chamber 29 through the orifice 31 into the exit gas stream causes a lowering of the diaphragm 19 and a closing of the main valve 17 against the flow of gas to the combustion chamber. This latter, however, does not in any way influence flow of gas to the pilot so that service is immediately restored when the ambient temperature drops and the ball valve 89 again rises to open the control circuit and, in effect, to open the main line.

Assuming that conditions are normal in the reset safety valve 23 and in the solenoid valve 25 and assuming that both are open for gas flow through the control circuit, gas enters the inlet chamber 101 of the pressure regulating valve via the control conduit 35C. When the valve 111 is closed, as illustrated in Fig. 2, it would be necessary to adjust the set screw 121 to open the valve 111 to a desired position. This permits the inlet gas pressure as modified by the pressure regulator to be exerted against the under side of the diaphragm 105, the upper side of the diaphragm 105 being subjected to atmospheric pressure. In this manner any increase in inlet gas pressure will tend to raise the diaphragm 105 and valve 113 and thus tend to close the control circuit 35. Similarly, any decrease of pressure in the inlet gas will effect a lowering of the diaphragm 105 and hence cause the valve 111 to move downwardly to open the control circuit 35. In this manner quite sensitive control of the pressure of the gas flowing through the control circuit 35 and in the exit chamber 13 can be maintained. Furthermore, effective control of the gas pressure in the exit chamber 13 is attained by control of the gas pressure in the control circuit 35 by means of a relatively small regulator 27, thus avoiding use of a large regulator for handling the main gas flow.

Gas leaving the pressure regulating device 27 passes into the control conduit 35D where it is provided with two possible pathways. First, the gas can pass via control conduit 35D and conduit 41 into the pressure closure chamber 29. Second, the gas can pass via orifice 31 and conduit 33 into the exit chamber 13.

Since the sole upward force tending to open the main valve 17 is the pressure exerted against the under side of the diaphragm 19, a rupture of the diaphragm releases such pressures and the main valve 17 remains closed against the flow of fluid in the main line. Leakage of fluid through the control circuit; for example, in response to a demand for heat and actuation of the solenoid valve; would pass through the ruptured diaphragm into the exit chamber 13 without influencing the closed main valve. This latter is a very important safety factor and points up an advantage in providing a control conduit operable on only a small proportion of the main fluid flow.

As indicated previously it appears to be very important to a satisfactory sensitivity of operation that the lower side of the diaphragm 19 be exposed to a predetermined and controlled inlet gas pressure via a control circuit which includes only necessary control devices responsive to conditions outside the unitary structure and that the upper side of the diaphragm 19 be subjected directly to exit gas pressures.

An important feature of my invention is that the invention lends itself to a simple construction and a simple assembly of parts. For example, a commercial embodiment; as shown in Figs. 2, 3, and 4; comprises a main body portion 125 which includes the inlet and exit pipe connections as well as the main valve seat portion. A lower body portion 127 is separated from the main body portion 125 by a gasket 129 and the peripheral portion 131 of the diaphragm 19. The screws 133 serve to secure the lower body portion 127 to the main body portion 125 and also serve to hold the diaphragm 19 in position. A gasket 133 separates the main body portion 125 from the various control devices 23, 25, 27, the latter control devices being secured to the main body portion by means of screws inserted through the openings 137 (as shown in Fig. 3).

The reset safety control device 23 (see Fig. 4) is made up of a right body portion 139 including the electromagnet 67; and a left body portion 141 including the reset button 75; and a center body portion 143, the latter including also a portion of the solenoid valve 25 as well as the lower portion 145 of the pressure regulating device 27. The upper end of the pressure regulating device and solenoid valve is a separate body portion 147.

The method of manufacture and assembly will be apparent to those skilled in the art since substantially all the walls and cavities are formed in simple casting operations. Interior conduits are similarly easily formed. As indicated previously the conduit 35B between the reset safety valve 23 and the solenoid valve 25 is drilled from the outside surface of the reset safety valve 23 and is then replugged 83 to avoid the escape of fluid to the outside. Similarly, the upper part 35D of the conduit from the pressure closure chamber 29 is drilled from the outside surface of the casting and then replugged. A third interior conduit 35C; that is, the conduit from the solenoid valve 25 to the pressure regulating device 27; is drilled angularly upwardly from the inlet pressure chamber 101 of the pressure regulating device 27 before the latter is joined to the main body portion 125, since prior to assembly this latter chamber is opened on its lower side as shown in Fig. 2.

It will be apparent to those skilled in the art that other embodiments of my invention can be constructed using the diagrammatic sketch, the drawings of the preferred commercial embodiment, and the description herein as examples, it being understood that it is not my intention to limit my invention to the subject matter chosen for purposes of illustration.

I claim:

1. The combination comprising a main gas valve including a housing structure and a pressure responsive member therein; a unitary control valve structure carried entirely by said housing structure for directing a fraction of the main valve inlet gas onto the pressure responsive member to control the main valve outlet pressure; said unitary control valve structure comprising a pilot flame-responsive valve means acting to hold the control circuit open, a manual reset means operative to move the flame-responsive valve means to an open position, a thermostatistically-operated valve means in series with the pilot flame-responsive valve means for opening and closing the control valve structure in response to sensed temperature variations, and automatic pressure regulating valve means in series with the thermostatically-operated valve means for controlling the pressure of the control valve gas directed onto the pressure responsive member.

2. The combination of claim 1 wherein the unitary control valve structure comprises a block-like housing having recesses in faces thereof defining passage portions of the three above-mentioned valve means.

3. A gas valve comprising a housing having upper and lower faces; a recess formed in said upper face to define an inlet chamber; a second recess formed in said lower face to define an outlet chamber; the interior housing wall formed by said recesses having a port therethrough; a valve element positioned on the inlet side of said port; a flexible diaphragm extending across the lower housing face; means joining the diaphragm with the valve element; a cover having its periphery engaged with the lower surface of the diaphragm and cooperating therewith to form a pressure chamber; a second housing having its lower face positioned on the aforementioned upper face of the first housing; first and second aligned bores extending inwardly from opposite side surfaces of said second housing; a third smaller diameter bore interconnecting said first and second bores; a passage extending from the second housing lower face to the first bore to put said first bore in fluid communication with the aforementioned inlet chamber; a second valve element within said first bore for controlling fluid flow into the third bore; electromagnetic means for holding said second valve element open; spring means holding said second valve element closed; a third valve element within the second bore for controlling fluid flow from the third bore into the second bore; a manually-actuated push button for closing said third valve element; said third valve element having an end portion thereof engageable with the second valve element when the push button is actuated so as to overcome the action of the spring means and thereby allow the electromagnetic means to exert a holding force on said second valve element; a natural gas outlet opening leading from the first bore; a bottled gas outlet opening leading from the third bore; a fourth bore extending downwardly from the upper face of the second housing; an annular insert within said vertical bore forming a second port; a vertically movable valve above said second port for controlling fluid flow therethrough; a passage from the second bore to the portion of the fourth bore above the insert; a second solenoid positioned on the upper face of the second housing for raising and lowering the vertically movable valve to open and close the second port, respectively; a third recess formed in the lower face of said second housing; a passage in said second housing leading from the portion of the vertical bore below the insert to the third recess; a fourth recess formed in the upper face of said second housing above the third recess; an opening in the dividing wall formed by said third and fourth recesses; a valve element within said third recess for controlling fluid flow through said last mentioned opening; a second diaphragm extending across the upper face of said second housing and closing the fourth recess; spring means biasing said second diaphragm downwardly; a stem joining the second diaphragm with the last mentioned valve element, whereby the fluid pressure in the fourth recess is regulated by the last mentioned spring means; and conduit means leading from the fourth recess to the aforementioned pressure chamber.

4. The combination comprising a main gas valve including a main housing structure having an upper face, and a recess formed therein to define an inlet chamber; said housing structure defining a main port and having a pressure responsive member therein for controlling flow through the main port; a unitary control valve stucture carried entirely by said main housing structure for directing a fraction of the main valve inlet gas onto the pressure-responsive member to control the main valve outlet pressure; said unitary control valve structure comprising a reset safety valve means responsive to pilot flame to hold the control circuit open and responsive to extinguishment of the pilot flame to close the control circuit, a thermostatically-operated valve means in series with the reset safety valve means for opening and closing the control circuit in response to sensed temperature variations, and automatic pressure regulating valve means in series with the thermostatically operated valve means for controlling the pressure of the control valve gas directed onto the pressure responsive member; said unitary control valve structure including an auxiliary housing structure positioned on the aforementioned upper face of the main housing with the control circuit thereof in communication with the inlet chamber; the face of said auxiliary housing structure exposed to the inlet chamber having a pocket formed therein, and a gas filter seated in said pocket to clean the control gas as it flows into the control circuit.

5. The combination comprising a main gas valve including a main housing structure and a pressure responsive member therein for controlling flow therethrough; a unitary control valve structure carried entirely on the main housing structure for directing a fraction of the main valve inlet gas onto the pressure responsive member to thereby control the main valve outlet pressure; said unitary control valve structure comprising a safety valve means responsive to pilot flame to hold the control circuit open and responsive to extinguishment of the pilot flame to close the control circuit, a thermostatically-operated valve means in series with the safety valve means for opening and closing the control valve structure in response to sensed temperature variations, and automatic pressure regulating valve means in series with the thermostatically operated valve means for controlling the pressure of the control valve gas directed onto the pressure responsive member.

References Cited in the file of this patent

UNITED STATES PATENTS

| | | |
|---|---|---|
| 664,146 | Hackett | Dec. 18, 1900 |
| 990,695 | Berger | Apr. 25, 1911 |
| 1,987,032 | Spence | Jan. 8, 1935 |
| 2,056,322 | Hoppe | Oct. 6, 1936 |
| 2,069,808 | Anderson | Feb. 9, 1937 |
| 2,178,974 | Smith | Nov. 7, 1939 |
| 2,237,404 | Boyd | Apr. 8, 1941 |
| 2,270,304 | Jacobsson | Jan. 20, 1942 |
| 2,409,947 | Mantz | Oct. 22, 1946 |
| 2,588,186 | Wasson | Mar. 4, 1952 |
| 2,614,622 | Eskin | Oct. 21, 1952 |
| 2,666,278 | Matasovic | Jan. 19, 1954 |
| 2,721,570 | Caparone | Oct. 25, 1955 |
| 2,731,033 | Cable | Jan. 17, 1956 |

FOREIGN PATENTS

| | | |
|---|---|---|
| 323,738 | Germany | Aug. 3, 1920 |
| 708,143 | Great Britain | Apr. 28, 1954 |